United States Patent [19]

Erhard

[11] Patent Number: 4,722,311
[45] Date of Patent: Feb. 2, 1988

[54] CAPACITOR IGNITION APPARATUS

[75] Inventor: Werner Erhard, Cadolzburg, Fed. Rep. of Germany

[73] Assignee: Prüfrex-Elektro-Apparatebau Inh. Helga Müller, geb./Dutschke, Cadolzburg, Fed. Rep. of Germany

[21] Appl. No.: 11,161

[22] Filed: Feb. 4, 1987

[30] Foreign Application Priority Data

Mar. 15, 1986 [DE] Fed. Rep. of Germany ....... 3608740

[51] Int. Cl.$^4$ .............................. F02P 5/15; F02P 3/08
[52] U.S. Cl. .................................... 123/418; 123/602; 123/603
[58] Field of Search ............... 123/416, 417, 418, 602, 123/603; 315/209 SC

[56] References Cited

U.S. PATENT DOCUMENTS

| | | | |
|---|---|---|---|
| 4,335,692 | 6/1982 | Miura | 123/602 X |
| 4,378,769 | 4/1983 | Haubner et al. | 123/417 X |
| 4,441,478 | 4/1984 | Fujimoto | 123/602 |
| 4,480,624 | 11/1984 | Anderson | 123/602 |
| 4,494,509 | 1/1985 | Long | 123/418 X |
| 4,509,493 | 4/1985 | Nash | 123/418 X |
| 4,527,248 | 7/1985 | Takase et al. | 123/418 X |
| 4,624,234 | 11/1986 | Koketsu et al. | 123/602 |
| 4,644,927 | 2/1987 | Okuda | 123/602 |
| 4,679,540 | 7/1987 | Abe et al. | 123/603 X |

Primary Examiner—Willis R. Wolfe
Attorney, Agent, or Firm—Jordan and Hamburg

[57] ABSTRACT

Capacitor ignition apparatus for internal-combustion engines with a magneto generator and an ignition pulse generator for the switching through of an electronic switch which discharges the capacitor via the primary winding of the ignition coil, wherein the ignition pulse generator triggered by the magneto generator and provided with a revolution counter effects via a stored ignition characteristics program a revolution-dependent delay of the ignition pulse with respect to the magneto generator pulse.

8 Claims, 5 Drawing Figures

CAPACITOR IGNITION APPARATUS

This invention relates to a capacitor ignition apparatus for internal-combustion engines having a magneto generator and a pulse generator for the switching through of an electronic switch which discharges the capacitor via the primary winding of an ignition coil.

In such capacitor ignition apparatus, the switching-through of the electronic switch occurs either by an external ignition pulse generator or also by an internal ignition pulse generator which, for example, starting from the charging state of the capacitor, generates via a voltage attenuator the required ignition signal. Compared to this latter kind of generation of the ignition signal, which has a very simple construction, the provision of an external ignition pulse generator has the advantage that a greater variability with regard to the selection and position of the instant of ignition is made possible. In known arrangements, however, the variability is more or less limited to the prior setting, i.e., although the designer can place the instant of ignition at any optimal desired instant, it is then no longer possible to vary the instant of ignition during operation, especially as automatically as possible, according to the particular load requirements.

Thus an object of the present invention is to provide a capacitor ignition apparatus of the initially mentioned kind wherein the instant of ignition can be randomly programmed.

Accordingly the invention provides that the ignition pulse generator, which is triggered by the magneto generator and provided with a revolution counter, effects via a stored ignition characteristics program a delay of the ignition pulse depending on the speed of revolution with respect to the magneto generator pulse.

Thus, with the apparatus according to the invention, at first, there is generated an ignition pulse which is shifted further ahead of the desired ignition instant than will ever be required in practice. Starting from this fixed instant, there now occurs a corresponding delay of the actual ignition pulse in accordance with the particular operating requirements and loads of the engine, i.e., the magneto generator pulse is sent through a delay circuit until it is released at its output as an actual ignition signal for the switching-through of the electronic switch, for example, a thyristor or a transistor. Due to a stored ignition characteristics program, depending on the rotational speed, there is not only generated another optimum timed delay of the ignition pulse, but it is thereby also possible to program the sparking instant differently for falling rotational speeds than for rising rotational speeds. For this purpose, in one embodiment of the invention, a revolution counter is provided such that it generates a signal which distinguishes between rising and falling rotational speeds. For this purpose it is required that also a memory is provided which stores the respective length of the interval between two preceeding pulses of the magneto generator and compares them with the last-measured interval in order to determine if the interval has become smaller (higher rotational speed) or if the interval has become greater and, thus, that the rotational speed has fallen.

The capacitor ignition apparatus according to the invention allows also a very simple protection of the internal-combustion engine against running in reverse, in that a detector of the rotational direction ca be provided which prevents the release of ignition pulses during the wrong direction of rotation of the engine. Such a detector of the rotational direction can be realized especially simply in that the number of the positive and/or negative half-waves induced in the magneto generator are determined. With regard to the conventional construction of such magneto generators with a U-shaped iron core and a coil arranged on a leg of the core, depending on the direction of rotation of the magnet wheel on which the permanent magnet is arranged, there results an induced voltage in the coil which consists either of two negative and a positive or of two positive and a negative half-wave. By determining the number of the positive and/or negative half-waves the direction of rotation of the magnet wheel can very simply be determined.

According t the invention the ignition pulse delay apparatus for the optimal programming of the particular instant of ignition can be constructed very simply in the form of a customer-specific circuit as a microchip comprising the detector of the rotational direction, the revolution counter, the ignition characteristics program and the pulse delay apparatus which, after all, already due to its small size, and due to its universal use, allows even the supplementation of already existing capacitor ignition apparatus.

Furthermore, it is also within the scope of the invention that the current supply of the ignition pulse generator has as an energy source a coil assigned to the magnet wheel of the magneto generator. This provision of a separate coil, wherein the magnet of the magnet wheel revolving around it induces a connected rectified and smooth supply voltage, results in less susceptibility to failure and feed-back with the circuit elements for the generation of the ignition pulse than if one respectively used one of the half-waves of the magneto generator pulse for the selection of the instant of ignition and the other half-wave for the generation of the supply voltage, as has already been suggested.

Further advantages, characteristics and details of the invention will be seen from the following description of exemplified embodiments as well as from the accompanying drawings.

DESCRIPTION OF THE PREFERRED EMBODIMENTS

Figure 1:
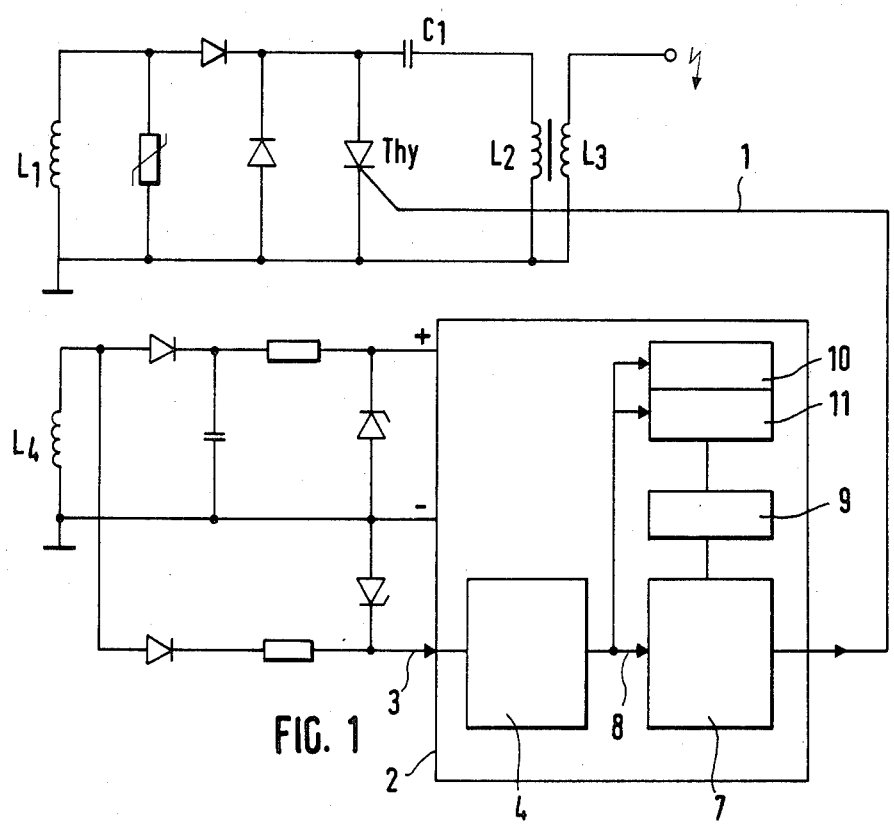
FIG. 1 is a circuit diagram illustrating partially in simplified form a block diagram of a capacitor ignition apparatus according to one embodiment of the invention.

The circuitry according to FIG. 1 shows in the upper part a conventional capacitor ignition apparatus in which the signal induced in the charging coil $L_1$ by a rotating magnet wheel charges the charging capacitor $C_1$ which is arranged in series with the primary winding $L_2$ of the ignition coil. By means of an ignition pulse arriving via the wire 1, the particular desired instant of ignition of the thyristor Thy is switched through and discharges the capacitor $C_1$ via the primary winding $L_2$ of the ignition coil so that in the secondary winding $L_3$ thereof the ignition pulse can be induced.

Figure 3:
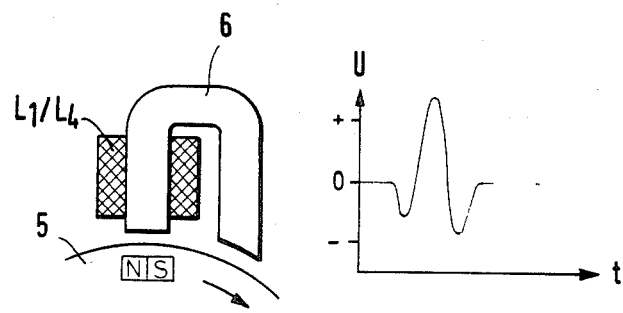
FIGS. 3 and 4 are schematic views of the magnet wheel and the charging coil with the respective induced voltages showing two different directions of rotation of the magnet wheel.
Figure 4:
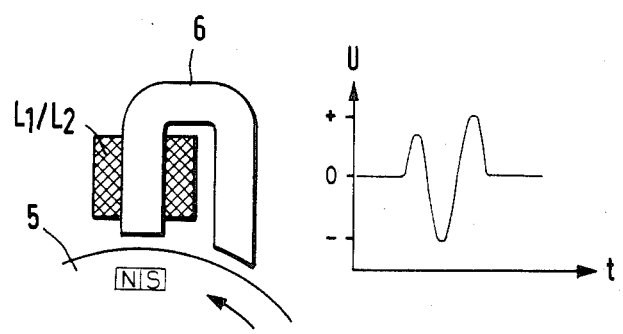
Figure 5:
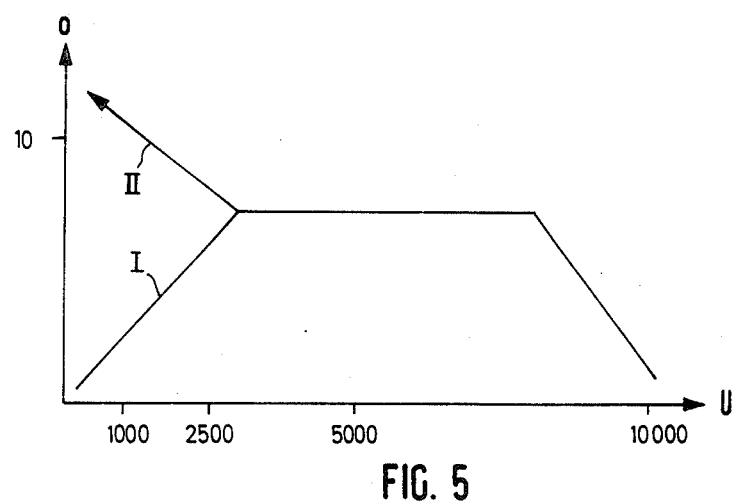
FIG. 5 is a schematic view of the ignition characteristics program for the timing of the ignition angle with respect to the rotational speed.

The circuitry illustrated in the lower part of FIG. 1 serves for the generation of the ignition pulse, whereby the elements arranged outside of the framed delay portion 2 representing the essence of the present invention, represent the current supply whereby, originating from a further coil $L_4$, there is generated a direct supply voltage induced by the magnet wheel. Via the input 3 the signal induced in $L_4$ is applied as an input pulse to the circuitry 2 which is, on the one hand, provided with a detector 4 for detecting the rotational direction. This detector of the rotational direction determines the number of the positive and/or negative half-waves of the input pulse from which, as individually shown in FIGS. 3 and 4, the direction of rotation of the magnet wheel can be determined. That is, in the charging coil $L_1/L_4$ arranged on the U-shaped iron core, the voltage is induced either by two negative and one positive half-waves, as shown in FIG. 3, or, on the other hand, during reverse direction of rotation of the magnet wheel, a voltage pulse according to FIG. 4 having two positive and one negative half-waves. The detector of the rotational direction is simply configured such that it only releases an input pulse supplied at input 3 as an output pulse, when the internal-combustion engine is running in the forward direction. This pulse is now fed to the actual pulse delay circuit 7 which releases the ignition pulse at the output via the wire 1 to the thyristor. The extent of the delay of the ignition signal fed at the input 8 of the pulse delay circuit which is essentially synchronous with the input pulse at 3, occurs in dependence on the rotational speed in accordance with a stored ignition characteristics program. The output pulse of the detector 4 for detecting the rotational direction is additionally supplied to a revolution counter 10 which not only determines by measuring the interval of two subsequent pulses the rotational speed itself but also determines whether the rotational speed is rising or falling. The corresponding circuitry portion 11 generates an identification signal, so that at equal rotational speed, there can be preprogrammed different rotational speeds in the ignition characteristics program respectively for rising and falling rotational speeds, as is shown in the schematic diagram in FIG. 5. Thus it is possible that during falling rotational speed, not the normal falling branch I of the ignition angle timing curve is observed respective to the rotational speed but, rather, that a pretiming according to the branch II is carried out which has the advantage that the engine cannot stop.

Figure 2:
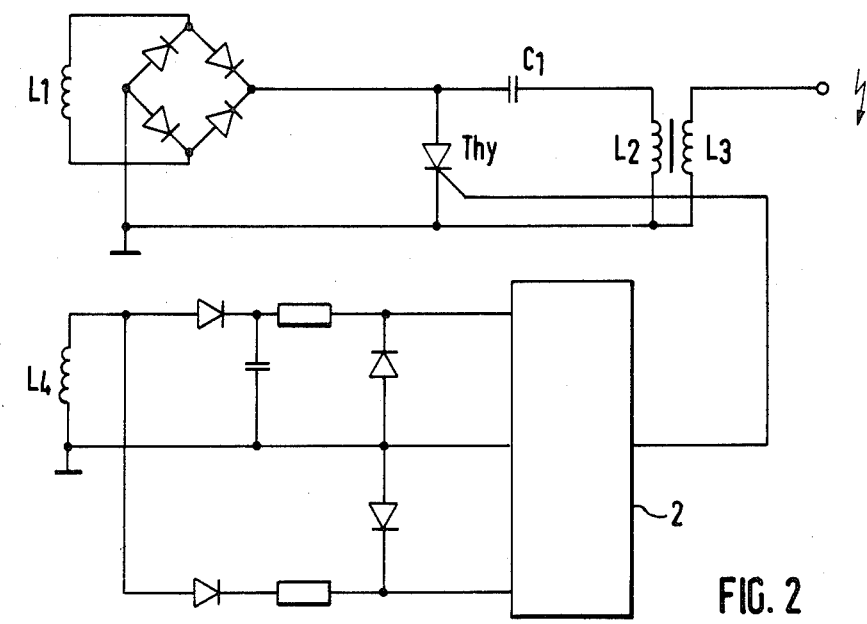
FIG. 2 is a circuit diagram of a modification of the circuit shown in FIG. 1 with a Graetz-rectifier in the charging circuit of the capacitor.

The circuitry according to FIG. 2 differs from that of FIG. 1 essentially only in that instead of the simple rectification of the charging pulse of the coil $L_1$ for the charging of the charging capacitor $C_1$ there is used a bridge-connected rectifier. The ignition pulse delay circuitry summarized in box 2 can preferably be constructed as a customer-specific circuit on a microchip.

What I claim is:

1. Capacitor ignition apparatus for internal-combustion engines of the type having a magneto generator and an ignition pulse generator for the switching through of an electronic switch which discharges a capacitor via the primary winding of an ignition coil, comprising an ignition pulse generator means triggered by the magneto generator, revolution counter means, and a stored ignition characteristics program means connected to said revolution counter means, said revolution counter means effecting via said characteristics program means a delay of the ignition pulse depending on the rotational speed with respect to the magneto generator pulse.

2. Capacitor ignition apparatus according to claim 1, wherein said revolution counter means further comprises means for generating a signal which distinguishes between rising and falling rotational speeds, said ignition characteristics program means containing different programs for rising and falling rotational speeds.

3. Capacitor ignition apparatus according to claim 2 further comprising a rotation direction detector means for detecting the direction of rotation and for preventing the release of ignition pulses during the incorrect direction of rotation of the engine.

4. Capacitor ignition apparatus according to claim 3, wherein said rotation direction detector means responds to the number of positive and/or negative half-waves induced in the magneto generator.

5. Capacitor ignition apparatus according to claim 4 further comprising a pulse delay circuit means connected to said ignition characteristics program means and to said revolution direction detector means.

6. Capacitor ignition apparatus according to claim 5 wherein said rotation direction detector means, said revolution counter means, said ignition characteristics program means, and said pulse delay circuit means are formed as a unitized circuit.

7. Capacitor ignition apparatus according to claim 6 wherein said unitized circuit is formed as a microchip.

8. Capacitor ignition apparatus according to claim 1 wherein the current supply of the ignition pulse generator has as an energy source a coil associated with the magnet wheel of the magneto generator.

* * * * *